US008935770B2

United States Patent
Matsugashita

(10) Patent No.: US 8,935,770 B2
(45) Date of Patent: Jan. 13, 2015

(54) AUTHENTICATION SYSTEM, AUTHENTICATION METHOD, AND STORAGE MEDIUM FOR REALIZING A MULTITENANT SERVICE

(75) Inventor: Hayato Matsugashita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 151 days.

(21) Appl. No.: 13/526,918

(22) Filed: Jun. 19, 2012

(65) Prior Publication Data

US 2012/0331539 A1 Dec. 27, 2012

(30) Foreign Application Priority Data

Jun. 24, 2011 (JP) .................................. 2011-140881

(51) Int. Cl.
| | | |
|---|---|---|
| G06F 21/00 | (2013.01) | |
| H04L 29/06 | (2006.01) | |
| G06F 21/41 | (2013.01) | |
| G06F 21/62 | (2013.01) | |

(52) U.S. Cl.
CPC ........ G06F 21/41 (2013.01); G06F 2221/2141 (2013.01); H04L 63/102 (2013.01); H04L 63/0807 (2013.01); G06F 2221/2119 (2013.01); G06F 2221/2117 (2013.01); G06F 21/6218 (2013.01)
USPC .................................. 726/9; 726/27; 707/703

(58) Field of Classification Search
CPC ..... G06F 21/62; G06F 21/6218; G06F 21/41; H04L 63/0807; H04L 63/104; H04L 63/102
USPC ........................................ 726/9, 27; 707/703
See application file for complete search history.

(56) References Cited

U.S. PATENT DOCUMENTS

| 5,787,428 | A | * | 7/1998 | Hart ........................................ 1/1 |
|---|---|---|---|---|
| 6,134,549 | A | * | 10/2000 | Regnier et al. .......................... 1/1 |
| 7,730,523 | B1 | * | 6/2010 | Masurkar ............................ 726/4 |
| 7,949,684 | B2 | * | 5/2011 | Brooks et al. .................. 707/802 |
| 8,291,490 | B1 | * | 10/2012 | Ahmed et al. .................... 726/17 |
| 8,335,850 | B2 | * | 12/2012 | Benedetto et al. ............. 709/226 |
| 2003/0023560 | A1 | * | 1/2003 | Soma ............................... 705/51 |
| 2005/0239454 | A1 | * | 10/2005 | Kawashima et al. ........ 455/426.1 |
| 2006/0010483 | A1 | * | 1/2006 | Buehler et al. .................... 726/1 |
| 2008/0313716 | A1 | * | 12/2008 | Park .................................. 726/4 |

(Continued)

FOREIGN PATENT DOCUMENTS

| JP | 2009118110 | * | 5/2009 | ............. G06F 21/20 |
|---|---|---|---|---|
| WO | WO02/093396 | * | 11/2002 | ............. G06F 15/16 |

OTHER PUBLICATIONS

Guo et al., "A Framework for Native Multi-Tenancy Application Development and Management", 2007, the 9th IEEE International Conference on E-Commerce.*

*Primary Examiner* — Kambiz Zand
*Assistant Examiner* — Tongoc Tran
(74) *Attorney, Agent, or Firm* — Canon USA, Inc., IP Division

(57) ABSTRACT

In order to prevent leakage of data possessed by a tenant to other tenants in multitenant service, it is necessary to control access. However, the conventional access control method is designed and developed to meet a specified request. Thus, costs for a dedicated design, development, administration, and maintenance need to be considered. Such costs can be reduced by using role information for each of a plurality of services and determining whether to allow or not allow access in a uniform manner.

13 Claims, 16 Drawing Sheets

(56) References Cited

U.S. PATENT DOCUMENTS

| | | | |
|---|---|---|---|
| 2008/0320143 A1* | 12/2008 | Benedetto et al. | 709/226 |
| 2010/0017415 A1* | 1/2010 | Kurumai et al. | 707/10 |
| 2010/0125612 A1* | 5/2010 | Amradkar et al. | 707/802 |
| 2010/0198730 A1* | 8/2010 | Ahmed et al. | 705/50 |
| 2010/0306817 A1* | 12/2010 | Grebenik et al. | 726/1 |
| 2011/0167256 A1* | 7/2011 | Lee et al. | 713/156 |
| 2011/0167483 A1* | 7/2011 | Lee et al. | 726/6 |
| 2011/0191485 A1* | 8/2011 | Umbehocker | 709/229 |
| 2011/0231912 A1* | 9/2011 | Lee et al. | 726/7 |
| 2012/0084869 A1* | 4/2012 | Bilaney et al. | 726/27 |
| 2013/0198236 A1* | 8/2013 | Lissack et al. | 707/783 |

\* cited by examiner

FIG.8
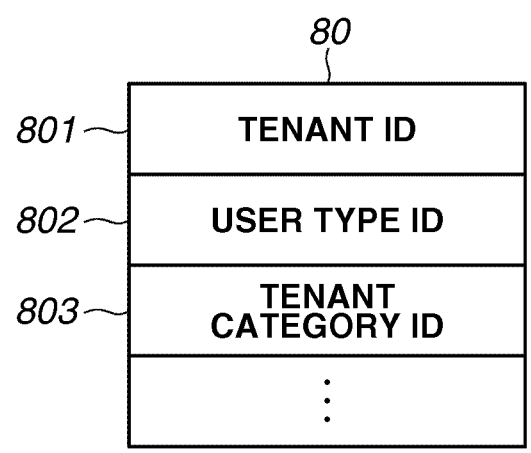
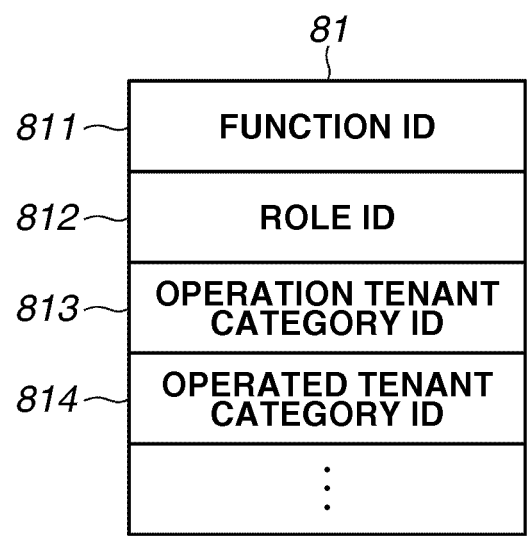

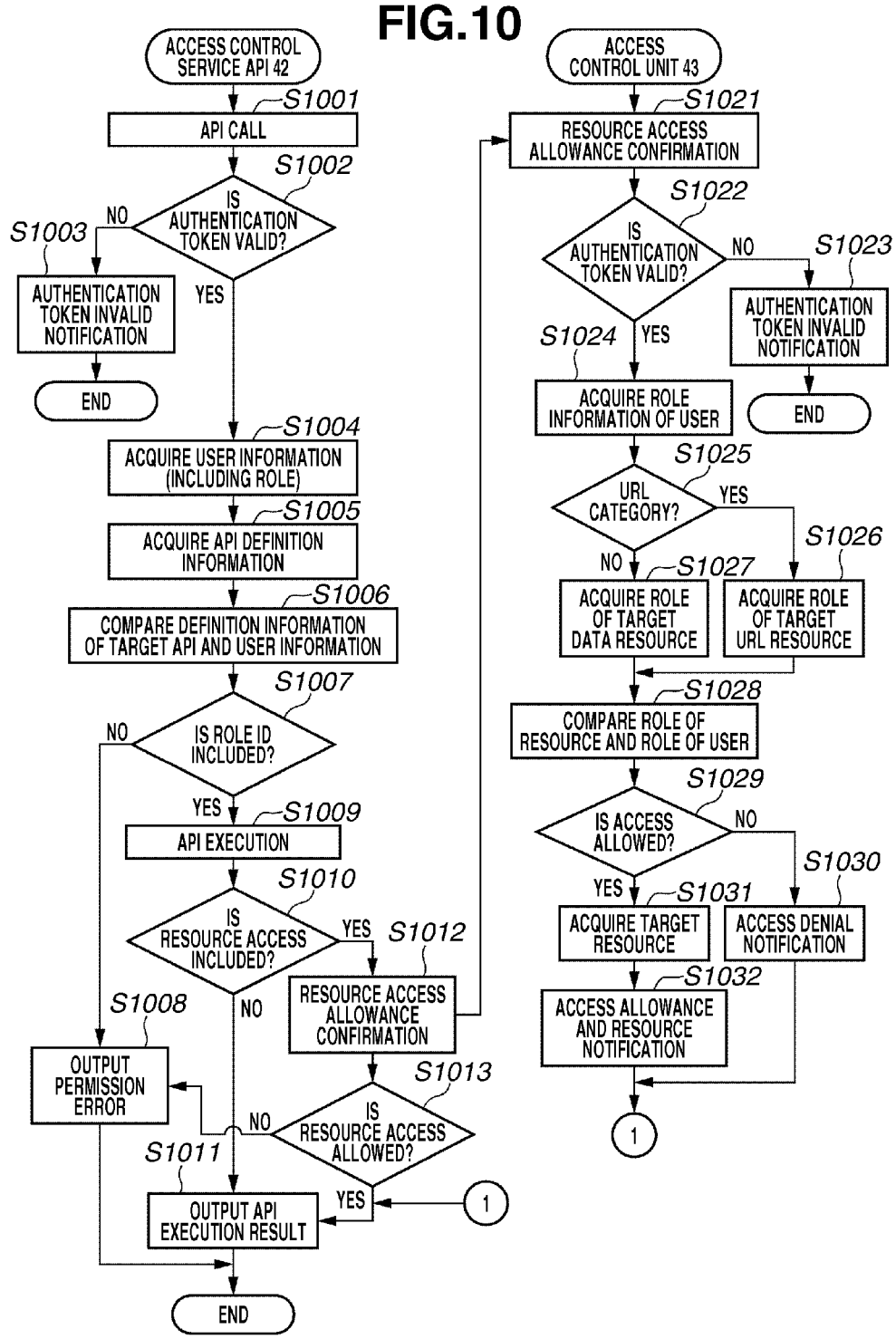

| USER TABLE | | | |
|---|---|---|---|
| USER ID | PASSWORD | USER TYPE ID | TENANT ID |
| SalesAdmin01 | ********** | TY00000001 | TA00000001 |
| SalesUser01 | ********** | TY00000001 | TA00000001 |
| CustomerAdmin01 | ******** | TY00000002 | TA00000002 |
| CustomerUser01 | ******** | TY00000002 | TA00000002 |
| ... | ... | ... | ... |

112

| USER ROLE TABLE | |
|---|---|
| USER ID | ROLE ID |
| SalesAdmin01 | SalesAdmin |
| SalesAdmin01 | Sales |
| SalesAdmin01 | TA00000001 |
| SalesAdmin01 | Provisioning |
| SalesUser01 | Sales |
| SalesAdmin01 | TA00000001 |
| CustomerAdmin01 | CustomerAdmin |
| CustomerAdmin01 | Customer |
| CustomerAdmin01 | TA00000002 |
| CustomerAdmin01 | Provisioning |
| CustomerUser01 | Customer |
| CustomerUser01 | TA00000002 |
| ... | ... |

FIG.12

121 ROLE CATEGORY TABLE

| ID | DESCRIPTION |
|---|---|
| ManagementRole | MANAGEMENT ROLE |
| ProductRole | PRODUCT ROLE |
| TenantRole | TENANT ROLE |
| ... | ... |

122 ROLE TABLE

| ROLE ID | ROLE CATEGORY ID |
|---|---|
| SalesAdmin | ManagementRole |
| Sales | ManagementRole |
| CustomerAdmin | ManagementRole |
| Customer | ManagementRole |
| Provisioning | ProductRole |
| TA00000001 | TenantRole |
| TA00000002 | TenantRole |
| ... | ... |

123 RESOURCE CATEGORY TABLE

| ID | DESCRIPTION |
|---|---|
| UrlResource | URL RESOURCE |
| DataResource | DATA RESOURCE |
| ... | ... |

124 RESOURCE ROLE TABLE

| RESOURCE ID | ROLE ID |
|---|---|
| R00000001 | Sales |
| R00000001 | Customer |
| R00000002 | Provisioning |
| R00000003 | TA00000001 |
| R00000004 | TA00000002 |
| ... | ... |

125 RESOURCE TABLE

| RESOURCE ID | RESOURCE CATEGORY ID | PROTECTED ITEM | AUTHORITY |
|---|---|---|---|
| R00000001 | UrlResource | http://xxx.com/menu/* | Read |
| R00000002 | UrlResource | http://xxx.com/search/* | Read, Update |
| R00000003 | DataResource | TY00000001 | Create, Read, Update, Delete |
| R00000004 | DataResource | TY00000002 | Create, Read, Update, Delete |
| ... | ... | ... | ... |

FIG.13

131 TENANT CATEGORY TABLE

| ID | DESCRIPTION |
|---|---|
| SalesTenant | SALES TENANT |
| CustomerTenant | CUSTOMER TENANT |
| Self | SELF |
| ... | ... |

132 TENANT TABLE

| TENANT ID | USER TYPE ID | TENANT CATEGORY ID |
|---|---|---|
| TA00000001 | TY00000001 | SalesTenant |
| TA00000002 | TY00000002 | CustomerTenant |
| ... | ... | ... |

133 API AUTHORITY TABLE

| FUNCTION ID | ROLE ID | OPERATION TENANT CATEGORY ID | OPERATED TENANT CATEGORY ID |
|---|---|---|---|
| CreateTenant | Sales | SalesTenant | CustomerTenant |
| ChangeRole | SalesAdmin | SalesTenant | SalesTenant |
| ChangeRole | CustomerAdmin | CustomerTenant | CustomerTenant |
| SearchUser | SalesAdmin | SalesTenant | SalesTenant |
| SearchUser | Sales | SalesTenant | Self |
| SearchUser | CustomerAdmin | CustomerTenant | CustomerTenant |
| SearchUser | Customer | CustomerTenant | Self |
| ... | ... | ... | ... |

FIG.16

| ROLE OPERATION ALLOWANCE/DENIAL ||||
|---|---|---|---|
| OPERATION ROLE ID | OPERATED ROLE CATEGORY ID | OPERATED ROLE ID | ALLOW/DENY |
| CustomerAdmin | ManagementRole | CustomerAdmin | Allow |
| CustomerAdmin | ManagementRole | Customer | Deny |
| CustomerAdmin | ProductRole | * | Allow |
| CustomerAdmin | TenantRole | * | Deny |
| Customer | * | * | Deny |

161

AUTHENTICATION SYSTEM, AUTHENTICATION METHOD, AND STORAGE MEDIUM FOR REALIZING A MULTITENANT SERVICE

BACKGROUND OF THE INVENTION

1. Field of the Invention

The present invention relates to an access control method of a plurality of resources regarding multitenant services.

2. Description of the Related Art

Conventionally, a web application is provided to each recipient of service such as corporations and organizations via a dedicated server. However, preparing a dedicated server for each recipient of service is not cost effective.

Thus, in recent years, a service called "multitenant service", which provides a same web application, loaded to a shared server, to a plurality of corporations and organizations has been receiving attention. A "tenant" is a unit of corporations and organizations which have conventionally provided services via dedicated servers.

Although the multitenant service is cost effective compared to a single tenant service where a dedicated server is used for each tenant, the multitenant service has drawbacks involving security. Conventionally, data possessed by a tenant is managed by a dedicated server of each tenant. Since the data of a tenant is physically separated from other tenants, the risk of data leakage is low.

However, regarding the multitenant service, since data of a plurality of tenants is managed by a shared server, the data is not physically separated. Accordingly, the risk of data leakage is high. Thus, according to the multitenant service, a mechanism that logically separates data is necessary in order to prevent data leakage between tenants.

Conventionally, a method that uses a tenant ID as a key for logically separating data is proposed. The multitenant service also uses this tenant ID. In other words, the multitenant service is realized by associating the tenant ID with a user ID, which is an attribute used for identifying a user, and assigning a tenant ID to the data which the tenant possesses.

To be more precise, according to the above-described method, a tenant ID, as well as a user ID, is specified according to user authentication. Then, when data is accessed, access to only the data with a same tenant ID is permitted.

The use of multitenant service contributes to cost reduction compared to when each tenant uses a dedicated server. However, the access control method of the multitenant service which is conventionally proposed is specially designed and developed.

Thus, the data access control method for solving issues of the multitenant service requires various costs associated with dedicated designing, development, administration, and maintenance.

On the other hand, there is known a method using a "role" in the conventional access control method of web application. For example, generally, access to a paid-for web application on the world Wide Web (WWW) requires user authentication and only a user who has agreed to pay for the application can access the web application.

As a control method for such access, a role is defined corresponding to an access right to a Uniform Resource Locator (URL) on the WWW. The access is controlled according to whether the user has such a role.

Further, as a conventional access control method, there is known a method that controls functions executable by a user according to the user authority. For example, execution of a function is allowed depending on whether the user has a role that indicates an administrator. This is because administrator authority is required in the acquisition, generation, and deletion of the user information.

SUMMARY OF THE INVENTION

The present invention is directed to an authentication system, authentication method, and a storage medium for realizing a multitenant service without increasing dedicated costs by solving problems using a unified method based on the conventional access control method.

According to an aspect of the present invention, an authentication system includes a management unit configured to manage whether a screen corresponding to a URL can be provided by role information, manage API execution authority by role information, and manage whether data can be distributed by role information, a reception unit configured to receive an access allowance/denial confirmation with respect to a resource and an authentication token, a determination unit configured to determine role information associated with the authentication token received by the reception unit, a URL verification unit configured to verify, if a resource type corresponding to the access allowance/denial confirmation received by the reception unit is a URL resource, whether access can be permitted based on the role information determined by the determination unit and role information of the URL resource based on management content of the management unit, a provision unit configured to provide a screen corresponding to the URL resource if the access is permitted by the URL verification unit, an API verification unit configured to verify, if a resource type corresponding to the access allowance/denial confirmation received by the reception unit is execution of an API, whether access can be permitted based on the role information determined by the determination unit and role information of execution authority of the API based on management content of the management unit, an execution unit configured to execute the API if the access is permitted by the API verification unit, and a data distribution verification unit configured to verify, if a resource type corresponding to the access allowance/denial confirmation received by the reception unit is distribution of data, whether access can be permitted based on the role information determined by the determination unit and role information of distribution of the data based on management content of the management unit; and a distribution unit configured to distribute the data if the access is permitted by the data distribution verification unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 8 illustrates a data structure of application program interface (API) authority information.

FIG. 10 is a flowchart illustrating an access control.

FIG. 11 illustrates a data example of the user information.

FIG. 12 illustrates a data example of resource information.

FIG. 13 illustrates a data example of the API authority information.

FIG. 16 illustrates a data example of role control information.

DESCRIPTION OF THE EMBODIMENTS

Various exemplary embodiments, features, and aspects of the invention will be described in detail below with reference to the drawings.

Figure 1:
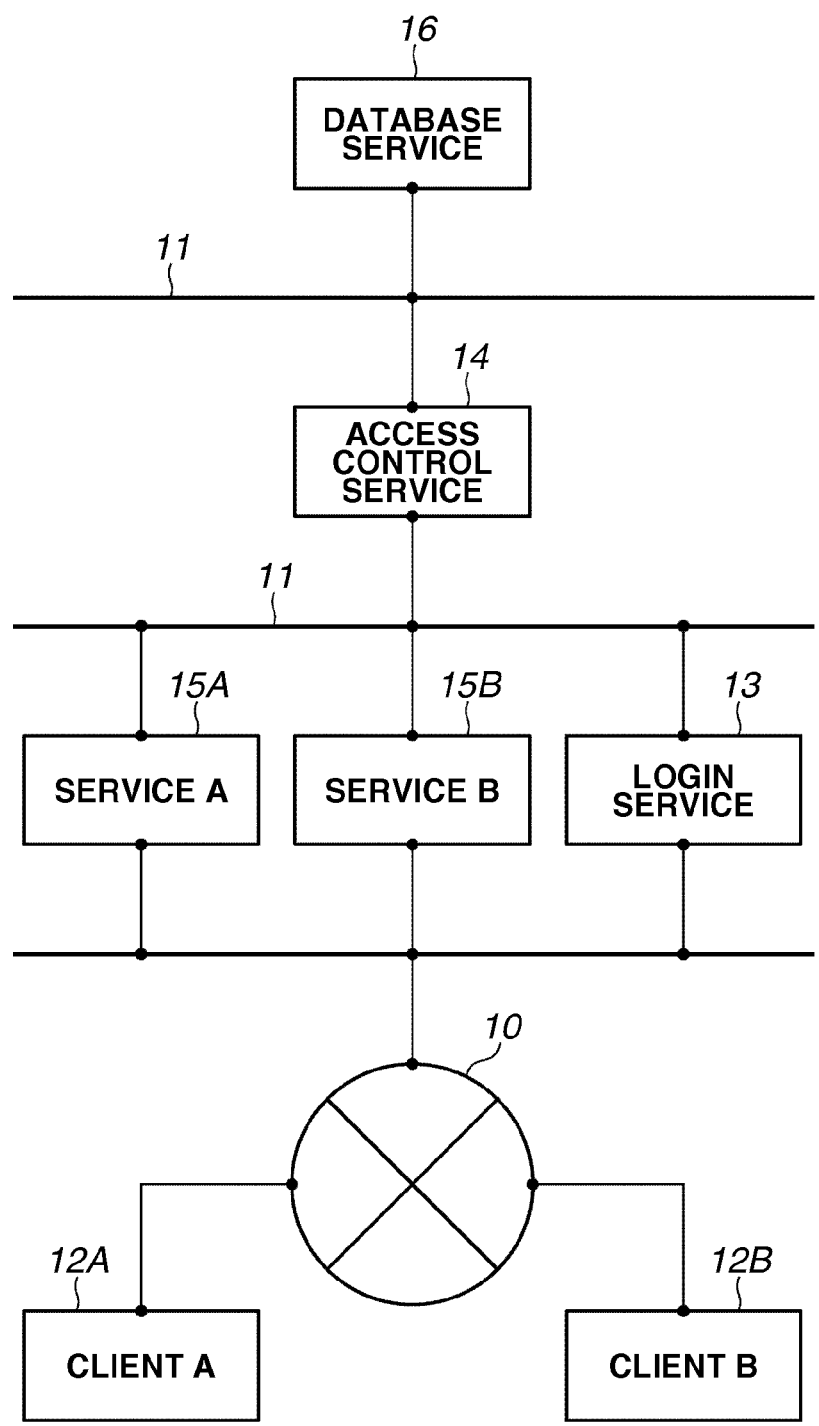
FIG. 1 illustrates a system configuration.

FIG. 1 is a block diagram illustrating a system configuration of an exemplary embodiment of the present invention.

In FIG. 1, a World Wide Web (WWW) system is constructed by a wide area network (WAN) 10. Each constituent of the system is connected to a local area network (LAN) 11.

A client 12, which is a computer that includes a web browser, issues a web request to each service via the WAN 10. The web browser is used when the client 12 uses the WWW system. The system according to the present embodiment includes a plurality of clients. In FIG. 1, the clients are illustrated as clients 12A and 12B but are also collectively referred to as the client 12. Regarding the clients 12A and 12B, communication other than requests to the WAN 10 is blocked by a firewall device (not illustrated).

A login service 13 presents a login screen used for user authentication and accepts a login request input by the user when a web request is issued by the client 12, and the request is transmitted to the login service 13 via the WAN 10 and the LAN 11.

An access control service 14 accepts an access permission request issued by the login service 13 or one or a plurality of services 15 via the LAN 11.

In FIG. 1, the services 15 are illustrated as services 15A and 15B but are also collectively referred to as a service 15. The services 15A and 15B provide various services to the client 12 according to a web request issued by the client 12 via the WAN 10 and the LAN 11.

A database service 16 accepts a data access request issued by the access control service 14 and transmitted via the LAN 11. The database service 16 employs a common Database Management System (DBMS). When the database service 16 accepts a data access query transmitted from the access control service 14, it outputs corresponding data in response.

Figure 2:
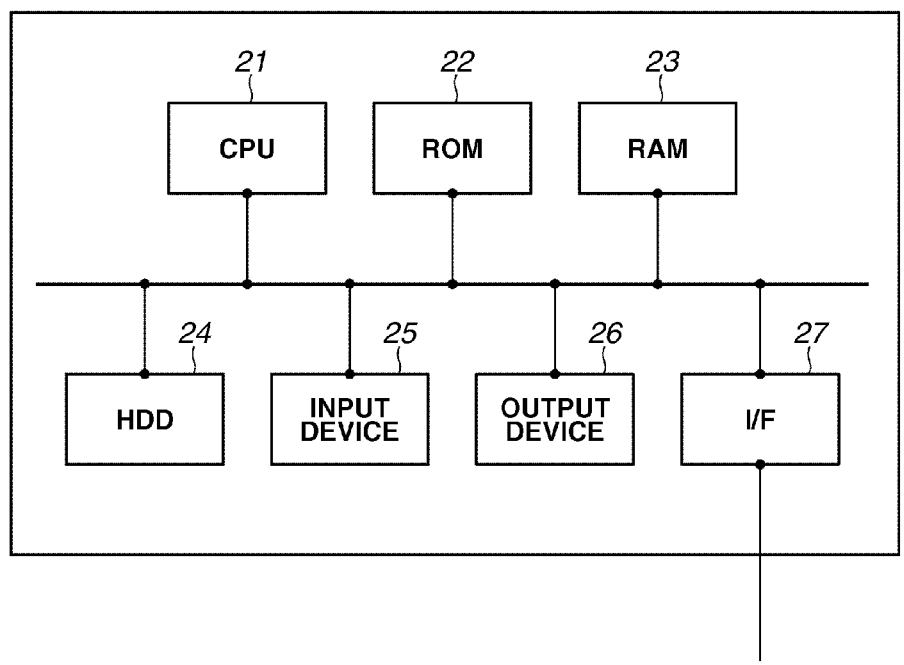
FIG. 2 illustrates a hardware configuration of each apparatus.

FIG. 2 is a block diagram illustrating a hardware configuration of the client 12, the login service 13, the access control service 14, the service 15, and the database service 16 in FIG. 1.

In FIG. 2, a central processing unit (CPU) 21 directly or indirectly controls each device (ROM, RAM, etc., described below) connected by an internal bus and executes a program that realizes the present exemplary embodiment. A read-only memory (ROM) 22 stores the basic input/output system (BIOS). A random access memory (RAM) 23 is a direct storage device which is used as a work area of the CPU 21 and a temporary storage area of a software module. The software module is used for realizing the present exemplary embodiment.

A hard disk drive (HDD) 24 stores an operating system (OS) that is basic software and software modules. An indirect storage device such as a solid-state drive (SSD) can also be used as the HDD 24. An input device 25 is, for example, a keyboard (not illustrated) or a pointing device (not illustrated). An output device 26 is connected to a display unit. An interface (I/F) 27 is connected to the WAN 10 or the LAN 11. More than one I/F 27 can be provided.

In the hardware configuration, after starting up, the BIOS is executed by the CPU 21 and the OS is loaded into the RAM 23 in an executable manner from the HDD 24. According to the operation of the OS, the CPU 21 loads each type of software modules described below from the HDD 24 into the RAM 23 as needed. According to the cooperation of each device described above, various software modules are executed and operated by the CPU 21.

The I/F 27 is connected to the LAN 11. The I/F 27 is controlled by the CPU 21 according to the operation of the OS and realizes transmission/reception of requests between services stored in each server. Furthermore, the I/F 27 is connected to the WAN 10 via the LAN 11 and realizes communication in the WWW system.

Further, the login service 13, the access control service 14, the service 15, and the database service 16 in FIG. 1 are realized by one or a plurality of servers having the hardware configuration illustrated in FIG. 2. If the above-described system configuration includes a plurality of servers, a load balancer (not illustrated) or a software module (not illustrated) can be used for load distribution and redundancy.

Figure 3:
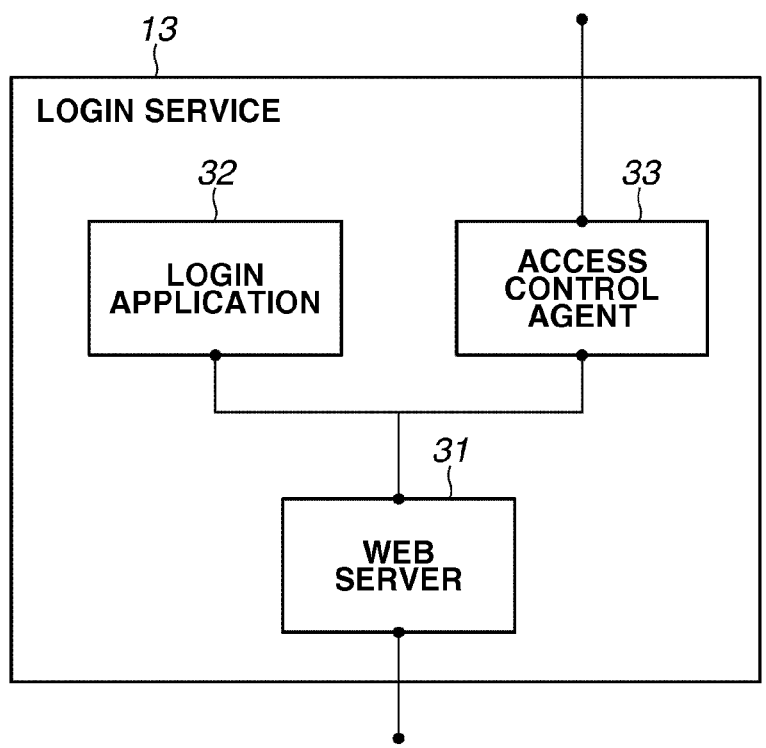
FIG. 3 illustrates a software module of a login service.

FIG. 3 illustrates a configuration of a software module that operates on the login service 13. Each software module is stored in the HDD 24 illustrated in FIG. 2. As described above, each software module is loaded into the RAM 23 and executed by the CPU 21.

A web server 31 is a web application server including a web interface that accepts a web request issued by the client 12.

A login application 32 is an application on the web server 31. The login application 32 generates a login screen when the web server 31 accepts a web request.

An access control agent 33 is a filtering application on the web server 31. The access control agent 33 performs filtering of a web request issued to the login application 32. By communicating with an access control agent I/F 41 in the access control service 14, the access control agent 33 executes user authentication.

In the following description, authentication processing executed by the cooperation of the above-described software modules is referred to as processing executed by the login service 13. Details of the user authentication processing executed by the login service 13 will be described below.

Figure 4:
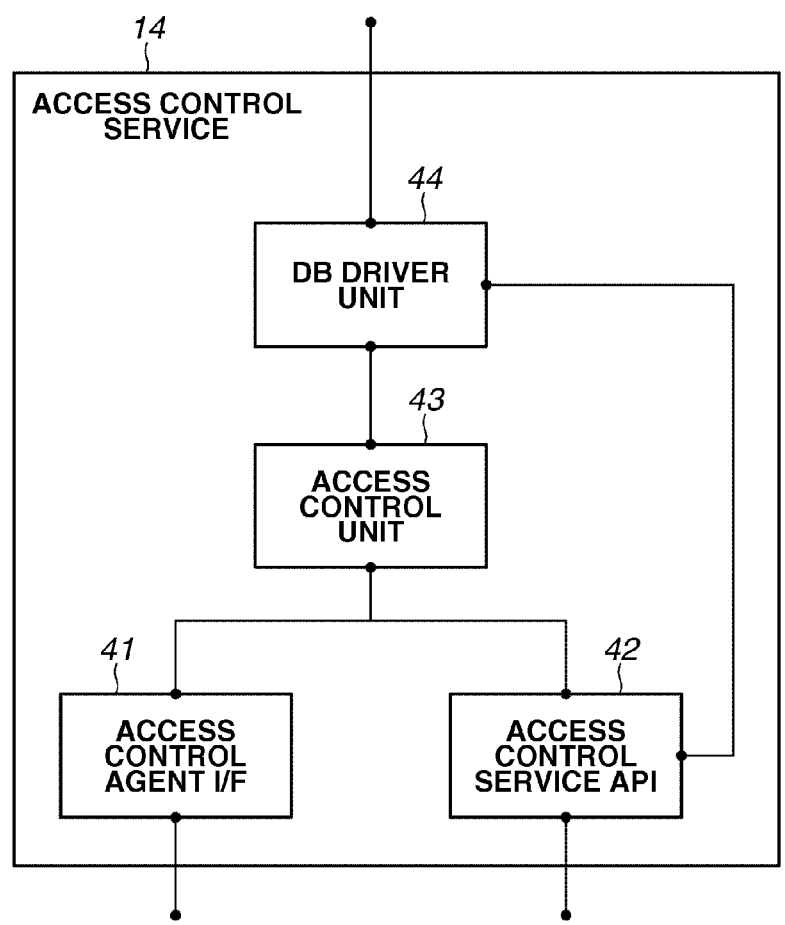
FIG. 4 illustrates a software module of an access control service.

FIG. 4 illustrates a configuration of a software module that operates on the access control service 14. Each software module is stored in the HDD 24 illustrated in FIG. 2. As described above, each software module is loaded into the RAM 23 and executed by the CPU 21.

In FIG. 4, the access control agent I/F 41 accepts a request issued by the login service 13, the access control agent 33 in the service 15, and an access control agent 53, and also responds to the request.

An access control service API 42 accepts an API call transferred from an access control service I/F 54 in the service 15 and outputs an API execution result.

An access control unit 43 is an application module that accepts an access right confirmation from the access control agent I/F 41 and the access control service API 42, and controls access right. The access control unit 43 acquires and updates data of the database service 16 via a database (DB) driver unit 44.

In the following description, access control processing executed by cooperation of the above-described software modules is referred to as processing executed by the access control service 14. Details of the access control processing executed by the access control service 14 will be described below.

Figure 5:
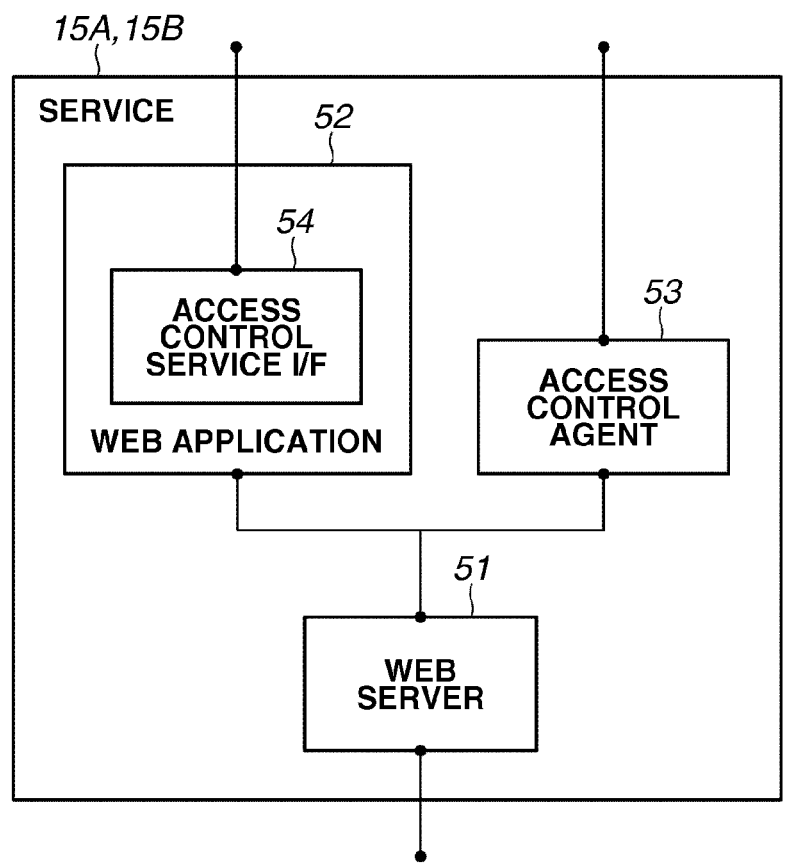
FIG. 5 illustrates a software module of a service.

FIG. 5 illustrates a configuration example of a software module that operates on the services 15A and 15B. Each software module is stored in the HDD 24 illustrated in FIG. 2. As described above, each software module is loaded into the RAM 23 and executed by the CPU 21.

A web server 51 is a web application server including a web interface that accepts a web request issued by the client 12.

A web application 52 is an application on the web server 51. The web application 52 generates a screen used for providing a service when the web server 51 accepts a web request.

The access control agent 53 is a filtering application on the web server 51. The access control agent 53 performs filtering of a web request issued to the web application 52. By communicating with an access control agent I/F 41 in the access control service 14, the access control agent 53 executes user authentication and access control.

In FIG. 5, the access control service I/F 54 invokes the access control service API 42 in the access control service 14. The access control service I/F 54 can be used from the web application 52.

In the following description, web application processing executed by the cooperation of the above-described software modules is referred to as processing executed by the service 15. Details of the web application processing executed by the service 15 will be described below.

Figure 6:
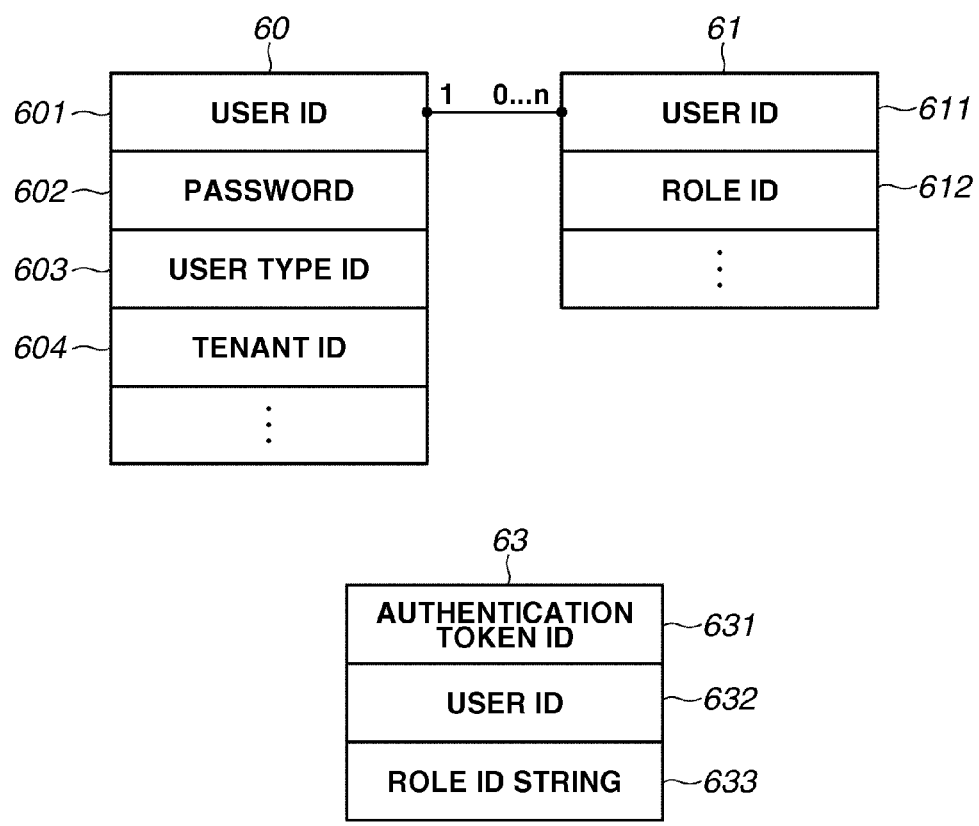
FIG. 6 illustrates a data structure of user information.

FIG. 6 illustrates a data structure of user information and a data structure of authentication token information which is generated when user authentication is performed. The user information, which includes a user table 60 and a user role table 61, is managed by the database service 16. Further, the authentication token information, which includes an authentication token cache 63, is stored in the RAM 23 of the access control service 14.

The user table 60 includes a user ID 601 used for identifying the user, a password 602 being confidential information, a user type ID 603 indicating a data access range of the user, and a tenant ID 604 used for identifying the tenant to which the user belongs. The user ID is also called user identification information.

The user role table 61 includes a user ID 611 used for identifying the user and a role ID 612 which is role information set for the user.

The authentication token cache 63 includes an authentication token ID 631 used for identifying the authentication token, a user ID 632 used for identifying the user, and a role ID string 633 as all role IDs set for the user. Thus, the authentication tokens and the role ID string are associated and managed.

Data of the authentication token cache 63 is generated when the user authentication processing is executed by the access control service 14 and when the authentication has been successful.

Figure 7:
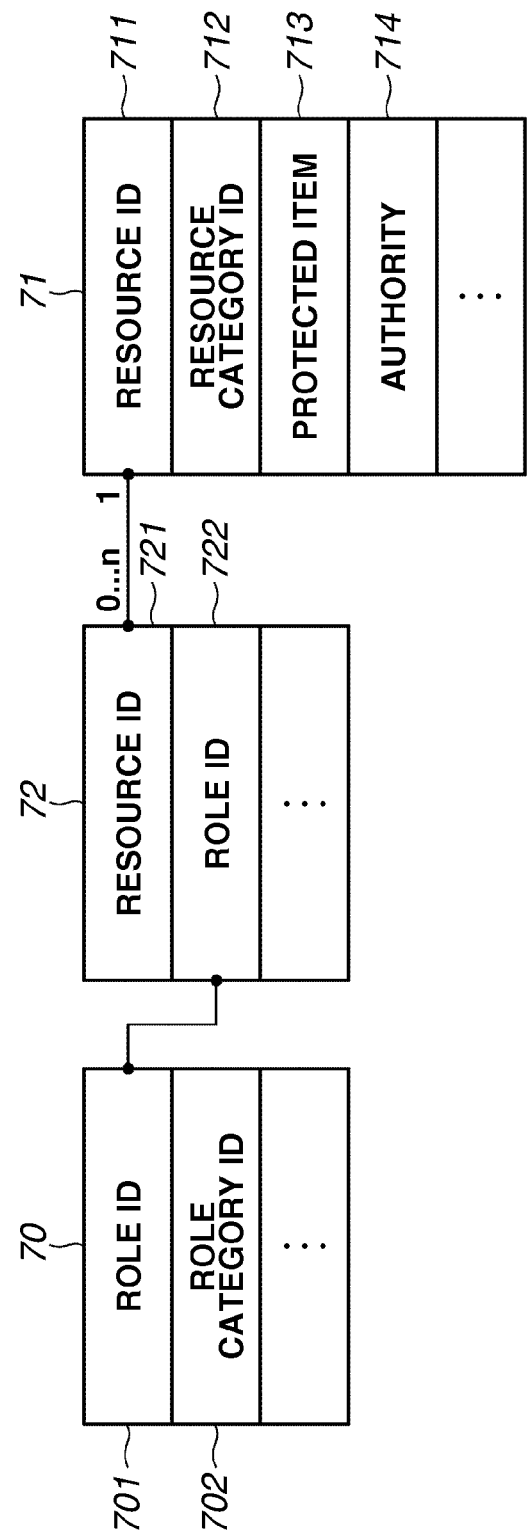
FIG. 7 illustrates a data structure of resource information.

FIG. 7 illustrates a data structure of the role information and resource information. The role information includes a role table 70 and the resource information includes a resource table 71. Further, the relation between the role and the resource is stored in a resource role table 72. These tables are managed by the database service 16.

The role table 70 includes a role ID 701 used for identifying a role and a role category ID 702 used for identifying a role category.

The resource table 71 includes a resource ID 711 used for identifying a resource, a resource category ID 712 used for identifying a resource category, a protected item 713 which is information managed as a resource, and an authority 714 which is authority information of the resource.

The resource role table 72 includes a resource ID 721 used for identifying a resource and a role ID 722 used for identifying a role.

FIG. 8 illustrates a data structure of tenant information and API execution authority information. The tenant information includes a tenant table 80, and the API execution authority information includes an API authority table 81. The tenant information and the API execution authority information is managed by the database service 16.

The tenant table 80 includes a tenant ID 801 used for identifying a tenant, a user type ID 802 set for a user that belongs to the tenant, and a tenant category ID 803 used for identifying a tenant category.

The API authority table 81 includes a function ID 811 used for identifying an API, a role ID 812 for identifying a role, an operation tenant category ID 813, and an operated tenant category ID 814. The operation tenant category ID 813 is used for identifying a category of the tenant to which an executor of the API belongs.

Further, the operated tenant category ID 814 is used for identifying a category of the tenant to which API execution target data belongs.

Processing of data stored in each data structure described with reference to FIGS. 6, 7, and 8 will be described in detail below.

Next, processing flow of each service according to the present exemplary embodiment will be described with reference to a sequence diagram.

Figure 9:
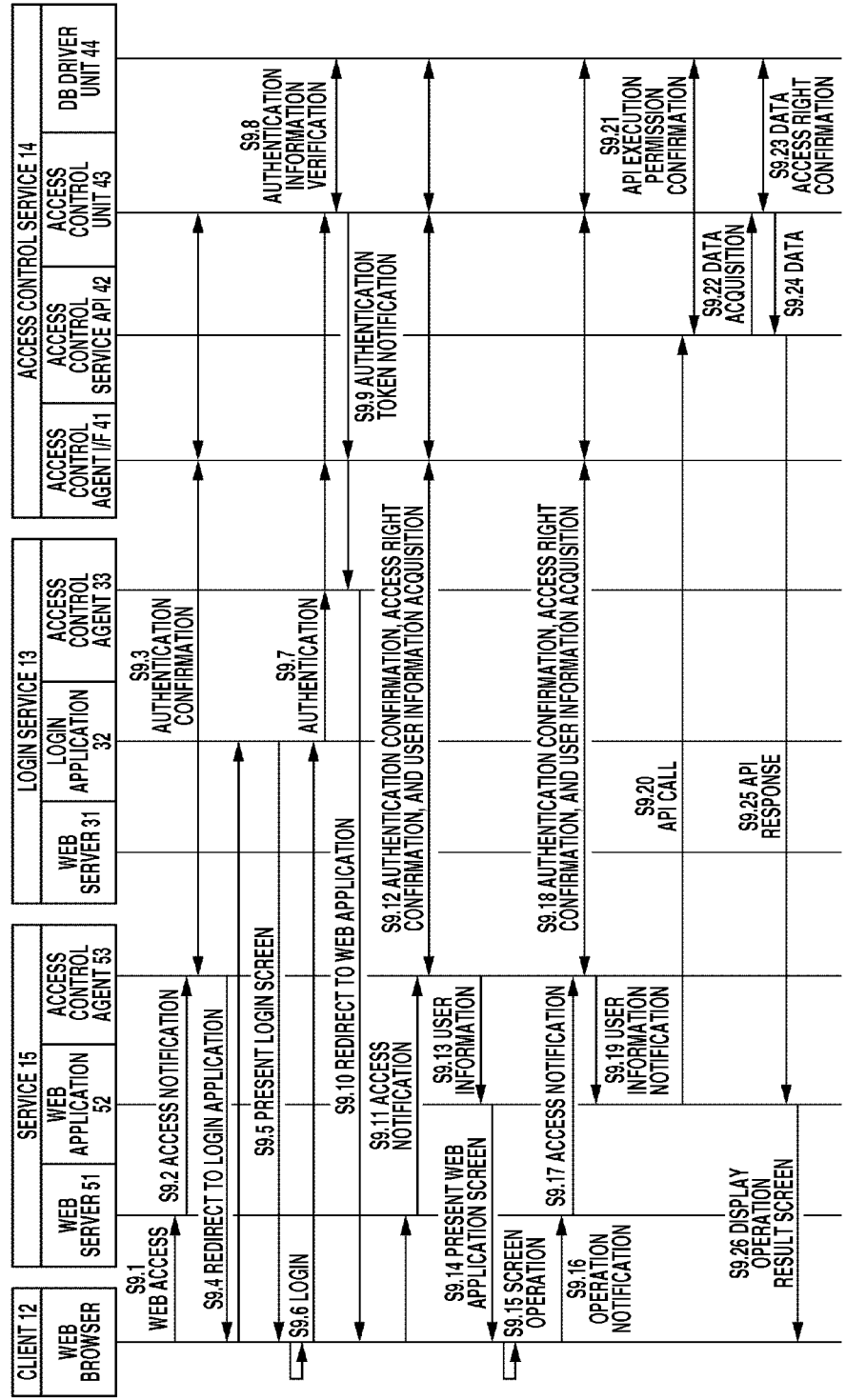
FIG. 9 is a sequence diagram illustrating an access sequence of a common web application.

FIG. 9 is a basic sequence diagram in a case where a web request is issued from a web browser of the client 12 to the service 15. In the following description, the control of the client 12 performed via the web browser is described as a control of the client 12.

In sequence S9.1, the client 12 issues a web request to the web server 51 of the service 15. In sequence S9.2, the web server 51 notifies the access control agent 53, which is a filtering application, of the request.

In sequence S9.3, the access control agent 53 accesses the access control unit 43 via the access control agent I/F 41 of the access control service 14 for authentication. At this time, an authentication token included in the web request is notified to the access control unit 43 via the access control agent I/F 41.

The access control unit 43 verifies whether the storage of the authentication token which has been notified is stored in the authentication token cache 63. Since the access in sequence S9.3 is the initial access, the notified authentication token is not stored in the authentication token cache 63. Thus, the access control unit 43 determines that the authentication token is not stored, and the access control unit 43 responds to the access control agent 53 via the access control agent I/F 41 that the client 12 is to be redirected to the login service 13.

In sequence S9.4, the access control agent 53 redirects the client 12 to the login application 32 in the login service 13. In sequence S9.5, the login application 32 generates a login screen and presents it to the client 12.

In sequence S9.6, the client 12 receives a login instruction input by the user via the login screen generated in sequence S9.5 and performs a login notification to the login application 32. At that time, user information, which is a user ID used for identifying the user and a password that is confidential information, is provided to the login application 32.

In sequence S9.7, the login application 32 that has received the login notification issues an authentication request to the access control unit 43 via the access control agent 33 and the access control agent I/F 41.

In sequence S9.8, the access control unit 43 that has received the authentication request verifies the user ID and the password included in the authentication request. In verifying the user ID and the password, the access control unit 43 compares the user ID and the password with the user ID 601 and the password 602 stored in the user table 60 in the database service 16 via the DB driver unit 44.

The password 602, which is confidential information, is preferably stored in a concealed manner using irreversible hash function. If the password 602 is stored in a concealed manner, the access control unit 43 verifies the password by concealing the password information of the notified authentication request using the function which is used when the password 602 has been stored and comparing the passwords.

In sequence S9.8, if the authentication of the user information is verified, the access control unit 43 generates an authentication token and stores it in the authentication token cache 63. At that time, the access control unit 43 acquires all the role IDs 612 from the user role table 61 via the DB driver unit 44 using the user ID as a key and stores them together with the user ID.

In sequence S9.9, the access control unit 43 notifies the access control agent 33 of the generated authentication token via the access control agent I/F 41.

In sequence S9.10, the access control agent 33 gives the received authentication token to the client 12 and redirects the client 12 to the web server 51 to which the web request has been issued in sequence S9.1. In sequence S9.11, the web server 51 issues the web request to the access control agent 53 as performed in sequence S9.2.

In sequence S9.12, the access control agent 53 accesses the access control unit 43 via the access control agent I/F 41 of the access control service 14 for authentication. At this time, an authentication token included in the web request is notified to the access control unit 43 via the access control agent I/F 41.

The access control unit 43 verifies whether the storage of the authentication token which has been notified is stored in the authentication token cache 63. In sequence S9.12, since the notified authentication token is stored in the authentication token cache 63 in sequence 9.8, the access control unit 43 determines the storage of the authentication token, which has been notified by the access control agent 53, in the authentication token cache 63. Accordingly, the access control unit 43 determines that the user information is authenticated, and performs resource access allowance/denial determination.

Details of the resource access allowance/denial determination processing will be described below. If the access control unit 43 determines that the resource access is permitted, the access control unit 43 acquires user information from the user table 60 via the DB driver unit 44. Then, the access control unit 43 notifies the access control agent 53 of the acquired user information via the access control agent I/F 41.

In sequence S9.13, the access control agent 53 issues a web request and provides the user information to the web application 52. In sequence S9.14, the web application 52 that has received the user information generates a business-use screen (not illustrated) and presents it to the client 12.

In sequence S9.15, the user inputs information via the screen. In sequence S9.16, the client 12 issues a web request to the web server 51. The web request includes information that the screen has been operated.

Since sequences S9.17, S9.18, and S9.19 are similar to sequences S9.11, S9.12, and S9.13 described above, their descriptions are not repeated.

Next, a case where the API of the access control service API 42 in the access control service 14 is executed according to the user operation in sequence S9.15 will be described.

In sequence S9.20, the web application 52 invokes the API of the access control service API 42 via the access control service I/F 54. At this time, the web application 52 provides the authentication token as an argument of the API.

In sequence S9.21, the access control service API 42 confirms the authority of the API execution. Details of the confirmation processing of the API execution authority will be described below. If the API execution is permitted, in sequence S9.22, the access control service API 42 issues a request for data acquisition to the access control unit 43 according to the processing content of the API. When the request is issued, the access control unit 43 is notified of the authentication token.

In sequence S9.23, the access control unit 43 confirms whether the data access is allowed. Details of the data access allowance/denial determination processing will be described below. If the data access is allowed, the access control unit 43 acquires the data via the DB driver unit 44. In sequence S9.24, the access control unit 43 provides the data to the access control service API 42.

In sequence S9.25, the access control service API 42 generates an API response based on the acquired data, and responds to the web application 52 via the access control service I/F 54.

In sequence S9.26, the web application 52 generates a screen corresponding to the API response, and presents it to the client 12.

According to the basic sequences described above with reference to FIG. 9, the user authentication processing and the user access right control processing is executed.

FIG. 10 is a flowchart illustrating the access control processing performed by the access control service 14 in the basic sequence described above with reference to FIG. 9.

In FIG. 10, the processing flow is started from step S1001 when the API call is made to the access control service API 42 in sequence S9.20 in FIG. 9.

In step S1001, the access control service API 42 receives the API call. In step S1002, the access control service API 42 determines whether the provided authentication token is valid. To be more precise, the access control service API 42 requests the access control unit 43 to confirm whether the authentication token is stored in the authentication token cache 63.

If the authentication token is determined as not valid (the authentication token is not stored) (NO in step S1002), the processing proceeds to step S1003. In step S1003, since the authentication token is not valid, the access control service API 42 responds that the API cannot be executed. On the other hand, if the authentication token is valid (YES in step S1002), the processing proceeds to step S1004. In step S1004, the access control service API 42 acquires a user ID via the access control unit 43 using the authentication token as a key. Subsequently, the access control service API 42 acquires user information from the user table 60 and tenant information from the tenant table 80.

In step S1005, the access control service API 42 acquires API authority information via the DB driver unit 44. In acquiring the information, the access control service API 42 uses a function ID of the API acquired from the API authority table as a key.

In step S1006, the access control service API 42 compares the acquired user information and the tenant information with the API authority information. In step S1007, the access control service API 42 determines whether the role ID 812 is included in the user information by using a category ID of the target tenant of the API and the tenant category ID 803 of the acquired tenant information.

If the acquired role ID is not included in the user information (NO in step S1007), the execution of the API is not allowed, and the processing proceeds to step S1008. In step S1008, the access control service API 42 issues an error. On the other hand, in step S1007, if the acquired role ID is included in the user information (YES in step S1007), the processing proceeds to step S1009. In step S1009, the API execution is performed. This processing is the API verification processing.

In step S1010, the access control service API 42 determines whether a resource access is included in the content of the API execution. If a resource access is not included in the content of the API execution (NO in step S1010), the processing proceeds to step S1011. In step S1011, the access control service API 42 generates an execution result of the API and issues an API execution result. On the other hand, if a resource access is included in the content of the API execution (YES in step S1010), the processing proceeds to step S1012. In step S1012, the access control service API 42 performs the resource access allowance/denial determination with respect to the access control unit 43.

The resource is, for example, the data resource which is information stored in the database service 16 or the URL resource of the web application provided by the service 15. The resource access allowance/denial determination performed by the access control unit 43 will be described below.

In step S1013, the access control service API 42 determines whether the resource access is permitted according to the result of the resource access allowance/denial determination performed by the access control unit 43. If the resource access is not allowed (NO in step S1013), the processing proceeds to step S1008. In step S1008, the access control service API 42 issues an error. On the other hand, if the resource access is allowed (YES in step S1013), the processing proceeds to step S1011. In step S1011, the access control service API 42 generates an execution result of the API based on the acquired resource information and issues an API execution result.

Next, the processing flow which is started from step 1021 when an access right confirmation with the access control unit 43 is made corresponding to sequences S9.12, S9.18, and S9.22 in FIG. 9 will be described. Further, the processing in step S1021 is also performed in step S1012 in FIG. 10 (resource access allowance/denial determination).

The processing in step S1021 is executed as a resource access allowance/denial determination of a URL resource in sequences S9.12 and S9.18, and a resource access allowance/denial determination of a data resource in sequence S9.22.

In step S1021, the access control unit 43 accepts a request for resource access allowance/denial determination. At this time, the access control unit 43 acquires an authentication token of the user that executes the resource access, a target resource category, protected item information, and action of the protected item. The protected item information is a URL if the resource category is a URL resource. The protected item information is a user type ID and an acquisition condition if the resource category is a data resource. Further, the action is selected fromCreate, Read, Update, and Delete (CRUD) with respect to the protected item.

In step S1022, the access control unit 43 determines whether the accepted authentication token is stored in the authentication token cache 63 and verifies the validity of the authentication token. As a result of the verification, if the authentication token is not valid (NO in step S1022), the processing proceeds to step S1023. In step S1023, the access control unit 43 sends out a notification informing that the authentication token is not valid. On the other hand, as a result of the verification, if the authentication token is valid (YES in step S1022), the processing proceeds to step S1024. In step S1024, the access control unit 43 acquires the user ID 632 and the role ID string 633 which correspond to the received authentication token. In the following description, the role ID is also referred to as role information.

In step S1025, the access control unit 43 determines whether the resource category (resource type) of the resource in the resource access allowance/denial determination request is a URL category. If the resource is a URL resource (YES in step S1025), the processing proceeds to step S1026. If the resource is a data resource (NO in step S1025), the processing proceeds to step S1027.

In steps S1026 and S1027, the access control unit 43 acquires all the role IDs and authority related to the resource from the resource table 71 and the resource role table 72 using the resource category ID and protected item information as a key.

In step S1028, the access control unit 43 compares the acquired role ID and the authority with the role ID associated with the authentication token accepted by the request and the action. In other words, processing in step S1028 is realized based on the managed content of each table.

In step S1029, the access control unit 43 determines whether the access is permitted. If the access right is not included as a result of the comparison, in other words, if the access is not permitted (NO in step S1029), the processing proceeds to step S1030. In step S1030, an access denial notification is output. If the access right is included as a result of the comparison, in other words, if the access is permitted (YES in step S1029), the processing proceeds to step S1031. In step S1031, the access control unit 43 acquires the target resource.

If the resource category is the data resource, data is acquired via the DB driver unit 44 using a designated acquisition range as a condition. At this time, the range of data to be acquired is narrowed by the range of the permitted user type ID. As a result, acquisition of data of other tenants whose authority is not stored can be prevented. Processing in steps S1028 and S1029 corresponds to URL verification processing or data distribution verification processing.

In step S1032, the access control unit 43 notifies the acquired resource and access permission.

According to the above-described basic sequence in FIG. 9 and the access control flow in FIG. 10, URL resource, data resource, and API execution authority confirmation can be realized by a unified method such as role definition and role control.

Figure 14:
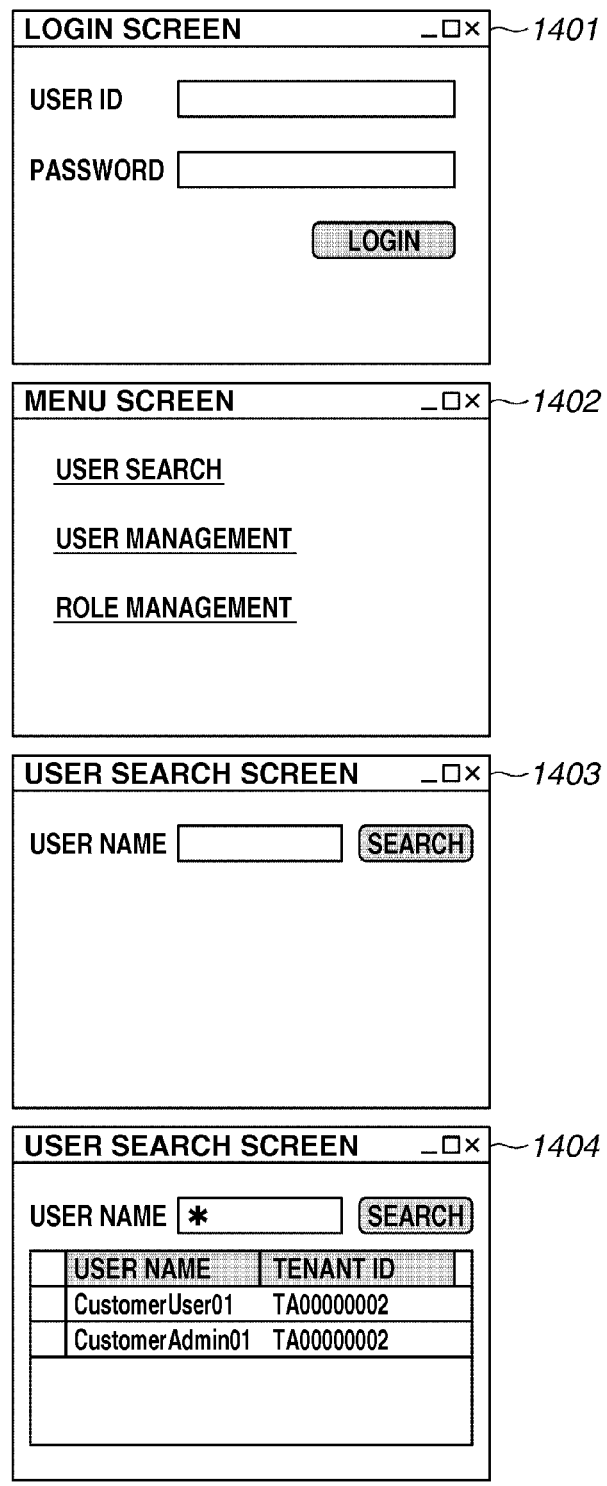
FIG. 14 illustrates an example of transition of a web application screen.

Next, data examples of tables having a data structure described with reference to FIGS. 6, 7, and 8 will be described with reference to FIGS. 11, 12, and 13. Further, the service provided by the service 15 is illustrated in FIG. 14 and an operation flow and an access control flow are described with reference to FIGS. 15 and 16. Data and services described below are examples and thus shall not be construed as limiting the scope of the present exemplary embodiment.

In FIG. 11, a user table 111 is a data example of the user table 60. A user role table 112 is a data example of the user role table 61.

In FIG. 12, a role category table 121 is a definition example of the role category. In the role category table 121, "ManagementRole" designates authority of data management, "ProductRole" designates a service contract with the user, and "TenantRole" designates access range with respect to data.

In FIG. 12, a resource category table 123 is a definition example of the resource category. In the resource category table 123, there are defined "UrlResource" as a target of the web access and "DataResource" which designates data managed by the database service 16.

In FIG. 12, a role table 122 is a data example of the role table. A resource role table 124 is a data example of the resource role table (also referred to as role management information). A resource table 125 is a data example of a resource table.

In FIG. 13, a tenant category table 131 is a definition example of a tenant category. In the tenant category table 131, there are defined categories such as "SalesTenant", "CustomerTenant", and "Self". "SalesTenant" designates a tenant of a sales provider that signed up a service contract with the user. "CustomerTenant" is a service recipient and "Self" is the user himself.

In FIG. 13, a tenant table 132 is a data example of a tenant table. The tenant table 132 in FIG. 13 is used when a new user is added to the user table 111.

An API authority table 133 is a data example of an API authority table. In FIG. 13, the API authority table 133 includes APIs such as "CreateTenant", "ChangeRole", and "SearchUser". "CreateTenant" is used when the service provider creates a tenant of a user with which a service contract has been signed. "ChangeRole" is used for changing a setting of a user role definition. "SearchUser" is used for searching a user that belongs to a tenant.

FIG. 14 is a screen flow diagram illustrating screens which are displayed when the service 15 provides a web application service (user management service) for managing settings of users and user roles.

A login screen 1401 is an example of a login screen generated by the login service 13. When the user enters a user ID and password and selects "login", if the login is successful and access is permitted, it causes a transition to a menu screen 1402. FIG. 14 illustrates a case where a user "CustomerAdmin01" registered in the user table 111 has performed a login.

The menu screen 1402 is an example of a menu screen of the user management service. If the user selects the user search link and access is permitted, it causes a transition to a user search screen 1403.

The user search screen 1403 is an example of a user search screen of the user management service. If the user inputs a user name in the user name box and selects the search button and if the execution authority of SearchUser API is allowed, the user search is executed. Then, a search result screen 1404 appears. The result on the screen is a result of the search when a wild card "*" (full text search) has been designated as the search item.

The search result screen 1404 is an example of a search result screen of a search of a user of the user management service. In the search result screen 1404, all the users of a tenant "TA00000002" which is a tenant of the user "CustomerAdmin01" in the user table 111 are displayed.

Figure 15:
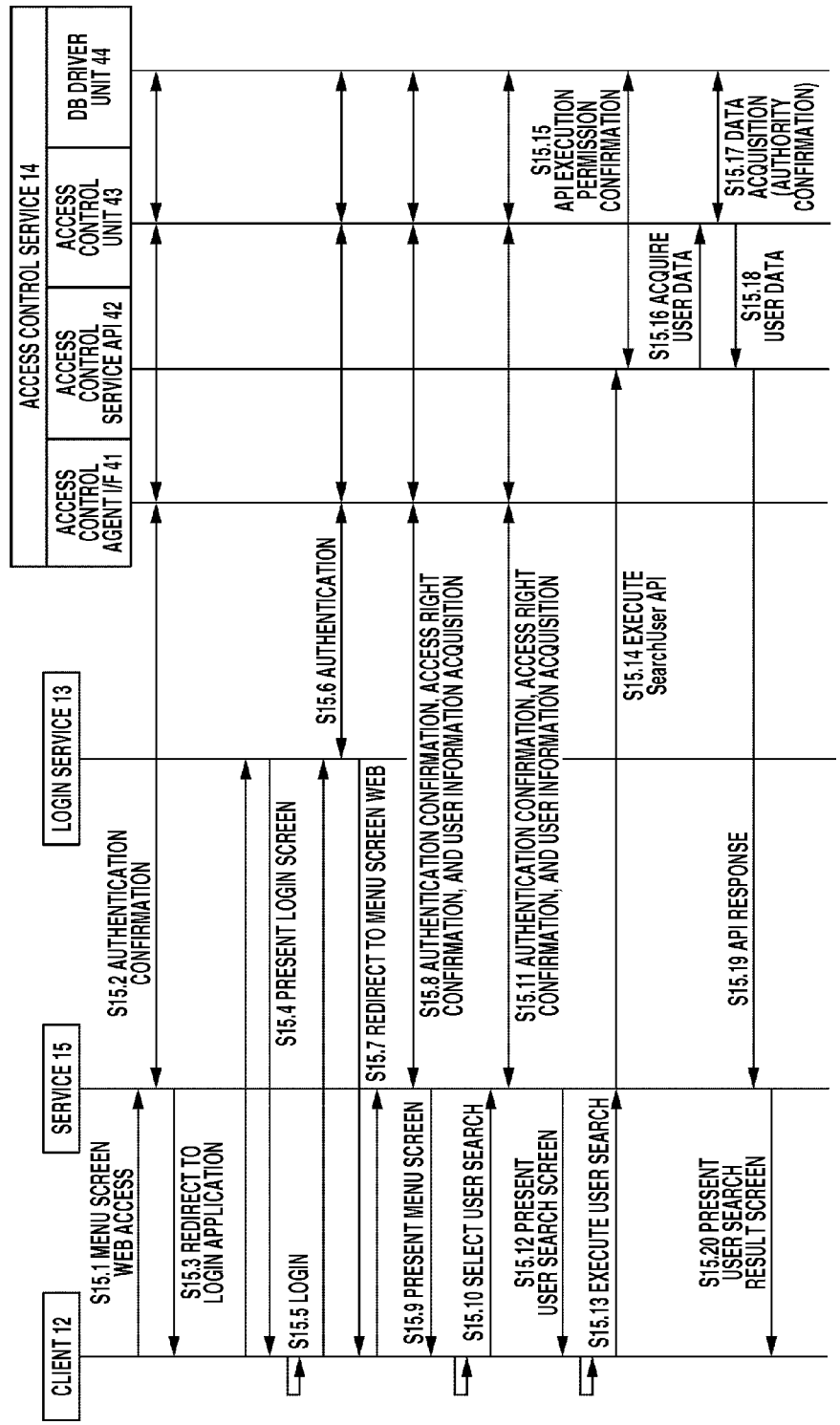
FIG. 15 is a sequence diagram illustrating an example of access of a web application.

FIG. 15 is a sequence diagram of an operation performed by the user according to the flow of the screen in FIG. 14.

In sequence S15.1, the client 12 issues a web request using the menu screen 1402 of the service 15. In sequence S15.2, the service 15 accesses the access control unit 43 via the access control agent I/F 41 for authentication. This authentication flow corresponds to sequences S9.1 to S9.3 in FIG. 9.

In sequence S15.3, the service 15 redirects the client 12 to the login service 13. In sequence S15.4, the login service 13 presents the login screen 1401 to the client 12. The processing in S15.3 and S15.4 corresponds to the processing in sequences S9.4 and S9.5 in FIG. 9.

In sequence S15.5, the user performs the login operation as the user "CustomerAdmin01" (user ID: CustomerAdmin01). This processing corresponds to the processing in sequence S9.6 in FIG. 9. In sequence S15.6, the login service 13 that received the login operation requests the access control unit 43 to perform the authentication processing via the access control agent I/F 41.

Since the authentication processing in sequence S15.6 is similar to the processing in sequence S9.7 in FIG. 9, the description is not repeated. If the authentication has been successful, the access control unit 43 stores an ID of the generated authentication token, the user ID (CustomerAdmin01), and a role ID in the authentication token cache 63. To be more precise, "CustomerAdmin, Customer, TA00000002, Provisioning" stored in the user role table 112 are stored as the role IDs (role ID string) in the authentication token cache 63.

In sequence S15.7, the login service 13 that has received the authentication gives an authentication token and the login service 13 redirects the client 12 to the menu screen 1402 of the service 15.

In sequence S15.8, the service 15 accesses the access control unit 43 for the authentication, access right confirmation, and user information acquisition via the access control agent I/F 41.

The access control unit 43 confirms whether the authentication token is stored in the authentication token cache 63. If the authentication token is stored in the authentication token cache 63, the access control unit 43 acquires the user ID and the role ID string. Since the authentication token is stored in the authentication token cache 63, the user ID "CustomerAdmin01" and the role ID string "CustomerAdmin, Customer, TA00000002, Provisioning" is acquired.

The access control unit 43 executes the processing in step S1021 in FIG. 10. At this time, if the access control unit 43 receives "http:xxx.com/menu/xxx.html" as the target resource which is realized, for example, by the user entering the above-described address into the browser. The resource matches the data of a resource ID "R00000001" in the resource table 125.

Further, since the resource ID "R0000001" is assigned to the role ID "Customer" in the resource role table 124, the access control unit 43 determines whether the role ID "Customer" is included in the role ID string acquired in the processing in step S1028 in FIG. 10.

More specifically, role information associated with the authentication token is determined from the authentication token cache 63. Whether the determined role information is included in the acquired role ID string is confirmed. In other words, if the resource category is URL, the access control unit 43 acquires a role ID that matches the URL from the resource role table 124 in FIG. 12.

Then, based on the role ID string acquired from the resource role table 124 and assigned to the role ID authentication token, whether to allow the access is determined. This processing is similarly executed in a different stage.

According to the data example described above, since "Customer" is included in the role ID string, the access control unit 43 acquires information from the user table 111 as access permission information, and notifies the service 15 of the information. In sequence S15.9, the service 15 presents the menu screen 1402 to the client 12.

The above-described processing corresponds to a first stage (first layer) of three stages (three layers) which are "display of the menu screen 1402 in FIG. 14", "API execution on the menu screen 1402", and "provision of resource data". Next, a sequence where the user selects the user search link on the menu screen 1402 will be described.

In sequence S15.10, if the user selects the user search, in sequence S15.11, the service 15 requests the access control unit 43 to perform authentication, access right confirmation, and user information acquisition via the access control agent I/F 41.

Then, the access control unit 43 determines whether the authentication token is stored in the authentication token cache 63. If the authentication token is stored, the access control unit 43 acquires the user ID and the role ID string. Since the authentication token is stored in this case, the user ID "CustomerAdmin01" and the role ID string "CustomerAdmin, Customer, TA00000002, Provisioning" are acquired.

Next, the access control unit 43 executes the processing in step S1021 in FIG. 10. At this time, if the access control unit 43 receives "http:xxx.com/search/xxx.html" as the target resource, this resource matches the data that corresponds to a resource ID "R00000002" stored in the resource table 125. Further, the resource ID "R0000002" is assigned to a role ID "Provisioning" in the resource role table 124.

According to the processing in step S1028 in FIG. 10, the access control unit 43 determines whether the role ID "Provisioning" is included in the acquired role ID string. Since the role ID "Provisioning" is included in the role ID string in this case, the access control unit 43 acquires information from the user table 111 as access permission, and notifies the service 15 of the information.

In sequence S15.12, the service 15 presents the user search screen 1403 to the client 12. The above-described processing corresponds to a second stage (second layer) of the three stages (three layers) which are "display of the menu screen 1402 in FIG. 14", "API execution on the menu screen 1402", and "provision of resource data".

Next, a sequence where the user inputs "*" as a wild card for the search item on the user search screen 1403 and selects the search button will be described.

In sequence S15.13, if the user search is executed, in sequence S15.14, the service 15 executes the SearchUser API with respect to the access control service API 42. At this time, the authentication token is notified to the access control service API 42.

In sequence S15.15, the access control service API 42 executes the processing in step S1001 in FIG. 10. At this time, since the user search has been executed, the access control service API 42 receives "SearchUser" as the target API.

The access control service API 42 verifies the authentication token and acquires the user ID, and the role ID string. Then, processing in step S1005 in FIG. 10 is executed and the function ID "SearchUser" is acquired from the API authority table 133. Then, two pieces of data corresponding to a role ID string "CustomerAdmin, Customer" is acquired.

In step S1006, the access control service API 42 determines from the data acquired from the API authority table that the execution authority of the SearchUser API of the operator tenant category ID "CustomerTenant" is permitted in the range of an operated tenant category "CustomerTenant", Self".

In sequence S15.16, the access control service API 42 executes in step S1010 in FIG. 10, the resource access allowance/denial determination request with respect to the access control unit 43 as an access to data resource. At that time, the access control unit 43 is notified of the authentication token and "*" for the user data table as the data acquisition range.

In sequence S15.17, the access control unit 43 determines whether the authentication token is stored in the authentication token cache 63. If the authentication token is stored, the access control unit 43 acquires the user ID and the role ID string. Since the authentication token is stored this time, the access control unit 43 acquires the user ID "CustomerAdmin01" and the role ID string "CustomerAdmin, Customer, TA00000002, Provisioning".

Next, the access control unit 43 executes the processing in step S1021 in FIG. 10. At this time, the access control unit 43 receives the "CustomerTenant, Self" as the target resource.

At the access control unit 43, since the data accessible range is the range of the tenant of the operator, the protected item will be "TY00000002" registered in the user table 111. This resource matches the data stored in the resource ID "R00000004" in the data resource table 125.

Then, resource ID "R0000004" is assigned to the role ID "TA00000002" in the resource role table 124. Thus, in step S1028 in FIG. 10, the access control unit 43 determines whether the role ID "TA00000002" is included in the acquired role ID string.

Since the role ID "TA00000002" is included in the role ID string, the access control unit 43 acquires information from the user table 111 as the access-permitted range of the range of "TY00000002". At that time, since the data range is wild card, all the data which can be acquired from the user data table in the range of "TY00000002" is acquired. In sequence S15.18, the access control service API 42 is notified of the data.

In sequence S15.19, as a response to SearchUser API, the access control service API 42 transfers the acquired user information to the service 15.

In sequence S15.20, the service 15 generates the search result screen 1404 using the acquired user information, and presents (distributes) it to the client 12.

The above-described processing corresponds to a third stage (third layer) of the three stages (three layers) which are "display of the menu screen 1402 in FIG. 14", "API execution on the menu screen 1402", and "provision of resource data".

According to the present exemplary embodiment, since the execution of all stages (all layers) is determined according to the role, cost of development, operation, and maintenance can be reduced.

According to the above-described sequence in FIG. 15 and the access control flow in FIG. 10, by using a unified method such as a role definition and role control, a URL resource, a data resource, and an API execution authority confirmation can be realized.

In FIG. 16, a role operation allowance/denial table 161 is a data example of execution allowance/denial of ChangeRole API which is executed when the role management is selected from a user management service menu and role setting of the user is changed via a role setting screen (not illustrated).

In sequence S15.15 in FIG. 15, if the API execution is permitted, the access control service API 42 performs the processing below.

First, from the role operation allowance/denial table, the access control service API 42 performs a refine search using a role ID of the API executor. The role category ID is acquired from the role ID that is a role setting change target, and the refine search is performed using an operated role category ID.

If the operated role category is "*", allowance/denial is determined. Then, refine search is performed using the role ID, and if the result is "*", allowance/denial is determined. If the role ID does not exist, it is determined as denied. As a result of the determination, if the result is "Allow", the API is executed. If the result is "Deny", the API execution is not executed.

According to the present exemplary embodiment, as illustrated in a definition 1611 in the role operation allowance/denial table 161, if the operated role category ID is "ManagementRole", the operation role ID needs to have "Admin" role.

According to the present exemplary embodiment, as a definition 1612 in the role operation allowance/denial table indicates, operated role ID "Customer" is defined so that no one can operate it. This is useful to prevent a setting error of a role ID of a different tenant category ID. In other words, it can limit access to a URL resource of a different tenant category ID and limit execution of API.

According to the present exemplary embodiment, as a definition 1614 in the role operation allowance/denial table 161 indicates, if the operated role category ID is "TenantRole", "allowance/denial" is set to "Deny" regardless of the operation role ID and the operated role ID. In this manner, setting of the role of "TenantRole" category to an inappropriate tenant can be prevented.

Thus, access limit can be set on tenant data excluding data of the tenant which belongs to. According to the present exemplary embodiment, service can be realized without increasing cost.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-140881 filed Jun. 24, 2011, which is hereby incorporated by reference herein in its entirety.

What is claimed is:

1. An authentication system comprising:
a reception unit configured to receive an access allowance or denial confirmation with respect to a resource and receive an authentication token associated with user identification information;
an identification unit configured to identify role information associated with the user identification information based on the authentication token received by the reception unit;
a Uniform Resource Locator (URL) verification unit configured to verify, if a resource type corresponding to the access allowance or denial confirmation received by the reception unit is a URL resource, whether access is permitted based on the role information identified by the identification unit and role information of the URL resource;
a provision unit configured to provide a screen corresponding to the URL resource if the access is permitted by the URL verification unit;
an application program interface (API) verification unit configured to verify, if a resource type corresponding to the access allowance or denial confirmation received by the reception unit is execution of an API, whether access is permitted based on the role information identified by the identification unit and role information of execution authority of the API;
an execution unit configured to execute the API if it is determined that the access is permitted by the API verification unit;
a data distribution verification unit configured to verify, if a resource type corresponding to the access allowance or denial confirmation received by the reception unit is distribution of data, whether access is permitted based on the role information identified by the identification unit and role information of distribution of the data; and
a distribution unit configured to distribute the data if it is identified that the access is permitted by the data distribution verification unit,
wherein the authentication system including the URL verification unit, the API verification unit and the data distribution verification unit executes three verifications, which are a verification of whether a screen corresponding to a URL can be provided, a verification of whether an API can be executed, and a verification of whether data can be distributed based on the role information associated with the user identification information.

2. The authentication system according to claim 1, further comprising:
a first storage unit configured to store, by using user identification information of a user, user information to be used for identifying a tenant the user belongs to and role information of the user;
a determination unit configured to determine, if the user identification information of the user is received by the reception unit as an authentication request from the user, whether the user is an authenticated user based on the received user identification information of the user and the user information stored in the first storage unit;
a generation unit configured to generate an authentication token of the user if the user is identified as an authenticated user by the identification unit, and
a second storage unit configured to store authentication token information in which the authentication token of the user generated by the generation unit is associated with the role information of the user specified by the user information,
wherein the identification unit determines role information associated with the authentication token using the authentication token information.

3. The authentication system according to claim 2, further comprising a second storage unit configured to store resource information to be used for specifying role information from a data resource,
wherein the URL verification unit, the API verification unit, and the data distribution verification unit perform verification using the authentication token information and the resource information.

4. An authentication system comprising:

a reception unit configured to receive an access allowance or denial confirmation with respect to a resource and receive an authentication token associated with user identification information;

an identification unit configured to identify role information associated with the user identification information based on the authentication token received by the reception unit;

an acquisition unit configured to acquire role information of each resource type corresponding to the access allowance or denial confirmation received by the reception unit; and a verification unit configured to verify whether access to the resource type is to be permitted or not by the role information corresponding to each resource type acquired by the acquisition unit and the role information identified by the first identification unit, wherein the authentication system executes three verifications, which are a verification of whether a screen corresponding to a Uniform Resource Locator (URL) can be provided, a verification of whether an application program interface (API) can be executed, and a verification of whether data can be distributed based on the role information associated with the user identification information.

5. An authentication method comprising:

receiving an access allowance or denial confirmation with respect to a resource and receiving an authentication token associated with user identification information;

identifying role information associated with the user identification information based on the received authentication token;

verifying, if a resource type corresponding to the received access allowance or denial confirmation is a Uniform Resource Locator (URL) resource, whether access is to be permitted based on the identified role information and role information of the URL resource;

providing a screen corresponding to the Uniform Resource Locator (URL) resource if it is identified that the access is permitted;

verifying, if a resource type corresponding to the received access allowance or denial confirmation is execution of an application program interface (API), whether access is to be permitted based on the identified role information and role information of execution authority of the API;

executing the API if it is identified that the access is permitted;

verifying, if a resource type corresponding to the received access allowance or denial confirmation is distribution of data, whether access is to be permitted based on the identified role information and role information of distribution of the data; and distributing the data if it is identified that the access is permitted, wherein the authentication method including all the verifying steps execute three verifications, which are a verification of whether a screen corresponding to a URL can be provided, a verification of whether an API can be executed, and a verification of whether data can be distributed based on the role information associated with user identification information.

6. The authentication method according to claim 5, the method comprising:

storing, by using user identification information of a user, user information used for identifying a tenant the user belongs to and role information of the user;

determining, if the user identification information of the user is received as an authentication request from the user, whether the user is an authenticated user based on the received user identification information of the user and the stored user information;

generating an authentication token of the user if the user is identified as an authenticated user, and storing authentication token information in which the generated authentication token of the user is associated with the role information of the user specified by the user information, wherein role information associated with the authentication token is identified using the authentication token information.

7. The authentication method according to claim 6, further comprising storing resource information to be used for specifying role information from a data resource, wherein verifying the (URL), the (API), and the data distribution is performed by using the authentication token information and the resource information.

8. An authentication method comprising:

receiving an access allowance or denial confirmation with respect to a resource and receiving an authentication token associated with user identification information;

identifying role information associated with the user identification information based on the received authentication token;

acquiring role information of each resource type corresponding to the received access allowance or denial confirmation;

determining whether access to the resource type is to be permitted or not based on the acquired role information corresponding to each acquired resource type and the identified role information; and executing a verification of whether a screen corresponding to a Uniform Resource Locator (URL) can be provided, a verification of whether an application program interface (API) can be executed, and a verification of whether data can be distributed based on the role information associated with the user identification information.

9. A storage medium storing a computer-executable program for causing a computer to execute operations comprising:

receiving an access allowance or denial confirmation with respect to a resource and receiving an authentication token associated with user identification information;

identifying role information associated with the user identification information based on the received authentication token;

verifying, if a resource type corresponding to the received access allowance or denial confirmation is a Uniform Resource Locator (URL) resource, whether access is to be permitted based on the identified role information and role information of the Uniform Resource Locator (URL) resource;

providing a screen corresponding to the Uniform Resource Locator (URL) resource if it is identified that the access is permitted;

verifying, if a resource type corresponding to the received access allowance or denial confirmation is execution of an application program interface (API), whether access is to be permitted based on the identified role information and role information of execution authority of the (API);

executing the application program interface (API) if it is identified that the access is permitted;

verifying, if a resource type corresponding to the received access allowance or denial confirmation is distribution of data, whether access is to be permitted based on the identified role information and role information of distribution of the data; and distributing the data if it is identified that the access is permitted, wherein the authentication method including all the verifying steps execute three verifications, which are a verification of whether a screen corresponding to a (URL) can be provided, a verification of whether an (API) can be executed, and a verification of whether data can be distributed based on the role information associated with user identification information.

10. The storage medium according to claim 9, wherein operations executed by the computer further comprise:

storing, by using user identification information of a user, user information used for identifying a tenant the user belongs to and role information of the user;

determining, if the user identification information of the user is received as an authentication request from the user, whether the user is an authenticated user based on the received user identification information of the user and the stored user information;

generating an authentication token of the user if the user is identified as an authenticated user, and storing authentication token information in which the generated authentication token of the user is associated with the role information of the user specified by the user information, wherein role information associated with the authentication token is identified using the authentication token information.

11. The storage medium according to claim 10, wherein operations executed by the computer further comprise storing resource information to be used for specifying role information from a data resource, wherein verifying the (URL), the (API), and the data distribution is performed by using the authentication token information and the resource information.

12. A storage medium storing a computer-executable program for causing a computer to execute operations comprising:

receiving an access allowance or denial confirmation with respect to a resource and receiving an authentication token associated with user identification information;

identifying role information associated with the user identification information based on the received authentication token;

acquiring role information of each resource type corresponding to the received access allowance or denial confirmation; and determining whether access to the resource type is to be permitted or not based on the acquired role information corresponding to each acquired resource type and the identified role information; and executing a verification of whether a screen corresponding to a Uniform Resource Locator (URL) can be provided, a verification of whether an application program interface (API) can be executed, and a verification of whether data can be distributed based on the role information associated with user identification information.

13. A system including an authentication system and a client comprising:

a transmission unit configured to transmit an access allowance or denial confirmation with respect to a resource and an authentication token to the authentication system;

a reception unit configured to receive from the client the access allowance or denial confirmation with respect to the resource and receive the authentication token associated with user identification information;

an identification unit configured to identify role information associated with the user identification information based on the authentication token received by the reception unit;

a Uniform Resource Locator (URL) verification unit configured to verify, if a resource type corresponding to the access allowance or denial confirmation received by the reception unit is a (URL) resource, whether access is permitted based on the role information identified by the identification unit and role information of the (URL) resource;

a provision unit configured to provide a screen corresponding to the (URL) resource if the access is permitted by the (URL) verification unit;

an application program interface (API) verification unit configured to verify, if a resource type corresponding to the access allowance or denial confirmation received by the reception unit is execution of an (API), whether access is permitted based on the role information identified by the identification unit and role information of execution authority of the (API);

an execution unit configured to execute the (API) if it is identified that the access is permitted by the (API) verification unit;

a data distribution verification unit configured to verify, if a resource type corresponding to the access allowance or denial confirmation received by the reception unit is distribution of data, whether access is permitted based on the role information identified by the identification unit and role information of distribution of the data; and a distribution unit configured to distribute the data if it is identified that the access is permitted by the data distribution verification unit, wherein the authentication system including the (URL) verification unit, the (API) verification unit and the data distribution verification unit executes three verifications, which are a verification of whether a screen corresponding to a (URL) can be provided, a verification of whether an (API) can be executed, and a verification of whether data can be distributed based on the role information associated with the user identification information.

* * * * *